United States Patent [19]

Ankney et al.

[11] Patent Number: 5,734,310
[45] Date of Patent: Mar. 31, 1998

[54] MAGNETIC LATCHING SOLENOID ASSEMBLY

[75] Inventors: Darrell E. Ankney, Dixon; Joel F. Klein; Curtis W. Fisher, both of Sterling, all of Ill.

[73] Assignee: Borg-Warner Automotive, Inc., Sterling Heights, Mich.

[21] Appl. No.: 601,798

[22] Filed: Feb. 15, 1996

Related U.S. Application Data

[63] Continuation-in-part of Ser. No. 512,971, Aug. 9, 1995.

[51] Int. Cl.$^6$ .................................................. H01F 7/08
[52] U.S. Cl. .................................... 335/228; 335/255
[58] Field of Search .......................... 335/228, 233, 335/234, 253, 254, 255, 258, 261, 270, 274, 278, 279; 310/15, 30, 33-35, 24, 152, 156, 14, 12

[56] References Cited

U.S. PATENT DOCUMENTS

| | | | |
|---|---|---|---|
| 2,383,411 | 3/1942 | Obszarny | 175/341 |
| 3,149,255 | 9/1964 | Trench | 310/30 |
| 3,805,204 | 4/1974 | Petersen | 335/255 |
| 4,306,207 | 12/1981 | Tada et al. | 335/234 |
| 4,422,060 | 12/1983 | Matsumoto et al. | 335/256 |
| 4,503,411 | 3/1985 | Lofstrand . | |
| 4,558,293 | 12/1985 | Haneda et al. | 335/255 |
| 4,660,010 | 4/1987 | Burton | 335/228 |
| 4,771,255 | 9/1988 | Shull et al. | 335/253 |
| 4,994,776 | 2/1991 | Juncu | 335/234 |
| 5,032,812 | 7/1991 | Banick et al. | 335/17 |
| 5,034,714 | 7/1991 | Bratkowski et al. | 335/234 |
| 5,121,018 | 6/1992 | Oldakowski | 310/77 |
| 5,272,458 | 12/1993 | Hoffman et al. | 335/179 |
| 5,291,170 | 3/1994 | Wahba et al. | 335/246 |
| 5,470,043 | 11/1995 | Marts et al. | 251/65 |
| 5,593,132 | 1/1997 | Hrytzak | 251/129.15 |

FOREIGN PATENT DOCUMENTS 2704810  9/1977  Germany .

OTHER PUBLICATIONS

IBM Technical Disclosure Bulletin, vol. 24, No. 10, Mar. 1982, p. 5205 XP002031094 –O.V. Berry & Al.: "Design aids for setting solenoid air gaps".

Primary Examiner—Adolf Berhane
Attorney, Agent, or Firm—Brooks & Kushman; Greg Dziegielewski

[57] ABSTRACT

A magnetic latching solenoid assembly comprises a bobbin having a central aperture formed therethrough along a central axis and having a solenoid coil wrapped therearound, and a metal polepiece secured at least partially within the bobbin. An at least partially metal armature is slidably movable within the central aperture. The polepiece includes a depression formed therein with a first flat formed at the bottom of the depression. The depression has a first wall formed at a first angle with respect to the central axis. The armature has a protruding portion for cooperation with the depression, the protruding portion having a second flat formed thereon for metal-to-metal engagement with the first flat, and having a second wall formed at a second angle greater than the first angle so that the first and second walls do not contact each other when the first and second flats are in contact.

13 Claims, 4 Drawing Sheets

MAGNETIC LATCHING SOLENOID ASSEMBLY

CROSS-REFERENCE TO RELATED APPLICATION

This application is a continuation-in-part of U.S. patent application Ser. No. 08/512,971, filed Aug. 9, 1995, entitled "Electromagnetic Actuator", which is assigned to the assignee of the present application and which is hereby incorporated by reference.

TECHNICAL FIELD

The present invention relates to electromagnetic actuators, and more particularly to a solenoid arrangement used for latching or as a three-way valve.

BACKGROUND ART

Solenoid type actuators are generally composed of a movable member or a plunger, one or more solenoid coils surrounding the plunger, and a yoke member accommodating the coils. When two coils are used, they are typically adapted to be energized alternately so that the plunger is moved in opposing directions by the electromagnetic attracting force acting between the plunger and the coils. Only one coil is energized for each stroke of the plunger.

Solenoid type actuators having a moving magnet are known in the art. For instance, U.S. Pat. No. 3,149,255 to Trench et al describes an electromagnetic motor with a moving magnet. The electromagnetic motor is intended specifically for use as a swing motor for an air pump or for use as a vibrator or the like. The apparatus is adapted to be driven by AC power.

Existing electromagnetic actuators can result in significant current drain as a result of the large magnetomotive force required to actuate the plunger. Also, some designs require the armature to act against a spring, thereby requiring additional current drain to compress the spring.

It is desirable to provide an electromagnetic actuator which is actuated by only momentarily energizing a coil and which becomes latched into position without additional current drain. It is particularly desirable to provide an electromagnetic actuator which is useful in actuating a vehicle axle latch member. It is also desirable to provide an electromagnetic actuator for use as a three-way valve mechanism.

It is further desirable to provide an electromagnetic actuator with improved holding characteristics, increased force in moving the armature, and greater armature travel.

SUMMARY OF THE INVENTION

Accordingly, the present invention provides particular applications for electromagnetic actuators which require only momentary energizing of the solenoid coils. Specifically, one embodiment provides an electromagnetically actuated three-way valve including inlet and outlet ports and a control port. The design includes a bobbin supporting first and second solenoids, with a polepiece in each solenoid. A movable magnet is electromagnetically actuated for blocking one of the inlet and outlet ports and communicating the other port with the control port. An alternative second embodiment provides a latching mechanism for a vehicle axle latching system comprising an electromagnetic actuator including a pair of solenoids on a bobbin. A movable magnet travels along the bobbin and includes a latching member extending therefrom for engaging or disengaging a vehicle axle latch member.

A further embodiment of the present invention provides an electromagnetic actuator with an armature having a protrusion cooperating with a depression on the polepiece. The depression and protrusion have conical walls which redirect the magnetic flux lines in a manner to increase the moving force of the armature. The walls are configured not to contact each other. The actuator also has improved holding characteristics and greater travel. Positioning of the armature magnet within the solenoid at all times increases the armature moving force.

More specifically, the present invention provides an electromagnetic actuator having a polepiece with a depression formed therein and an armature with a protrusion formed thereon for cooperation with the depression. The depression and protrusion have corresponding mating flat metal surfaces through which magnetic flux lines are concentrated. The depression and protrusion each include angled walls which direct magnetic flux lines through the flat surfaces to increase the armature moving force. This design provides improved holding characteristics, increased force in moving the armature, and greater armature travel.

Another aspect of the present invention provides a magnetic latching solenoid assembly comprising a bobbin having a central aperture formed therethrough along a central axis and having a solenoid coil wrapped therearound, and a metal polepiece secured at least partially within the bobbin. An at least partially metal armature is slidably movable within the central aperture, and includes a magnet which is always positioned within the central aperture. The polepiece includes a depression formed therein and a first flat formed at the bottom of the depression. The depression has a first wall formed at a first angle with respect to the central axis. The armature has a protruding portion for cooperation with the depression, the protruding portion having a second flat formed thereon for metal-to-metal engagement with the first flat, and having a second wall formed at a second angle greater than the first angle so that the first and second walls do not contact each other when the first and second flats are in contact.

Accordingly, an object of the present invention is to provide an electromagnetic actuator with improved holding characteristics, increased force in moving the armature, and greater armature travel.

Another object of the present invention is to provide an electromagnetic actuator with a polepiece having a depression and an armature having a protrusion for metal-to-metal mating with the depression in order to improve armature holding and moving forces.

The above objects and other objects, features and advantages of the present invention are readily apparent from the following detailed description of the best mode for carrying out the invention when taken in connection with the accompanying drawings and appended claims.

DETAILED DESCRIPTION OF THE PREFERRED EMBODIMENTS

Figure 1:
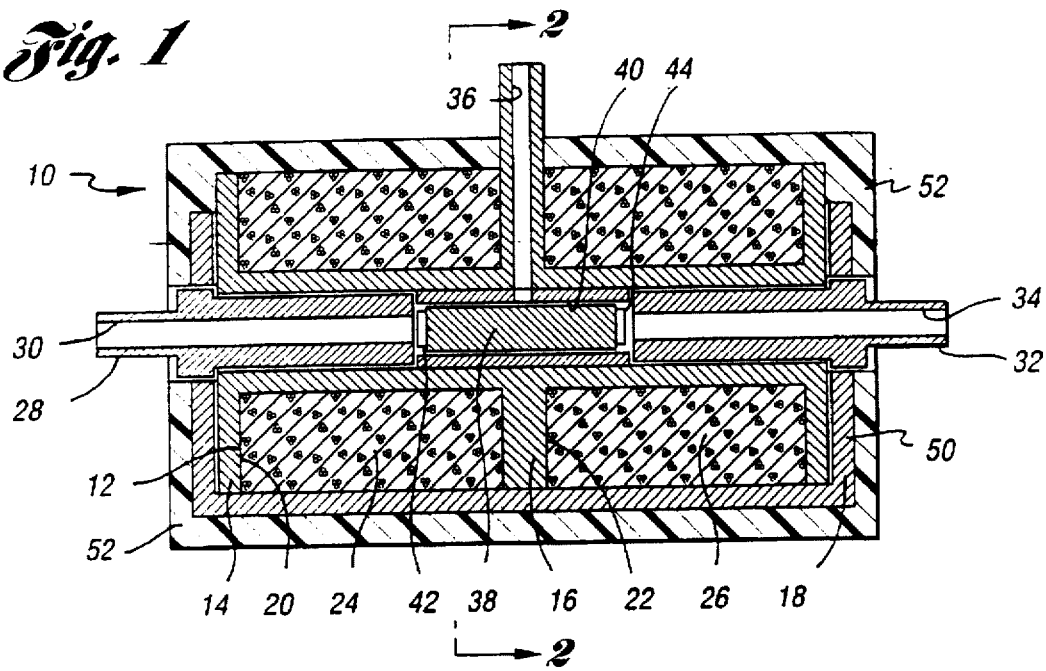
FIG. 1 shows a sectional view of a latching three-way valve in accordance with the present invention.

FIG. 1 shows a particular application for an electromagnetic actuator in accordance with the present invention. More specifically, FIG. 1 shows a sectional view of a three-way valve assembly 10. The three-way valve assembly 10 includes a bobbin 12 having flanges 14, 16, 18, which cooperate to form first and second annular channels 20, 22 around the bobbin 12. The first and second solenoids 24, 26 are received within the first and second annular channels 20, 22.

A first polepiece 28 is disposed at least partially within the first solenoid 24, and contains an inlet port 30 therethrough. A second polepiece 32 is disposed at least partially within the second solenoid 26, and contains an outlet port 34 therethrough. The bobbin 12 has a radial control port 36 therethrough in fluid communication with the inlet port 30 and outlet port 34.

Figure 2:
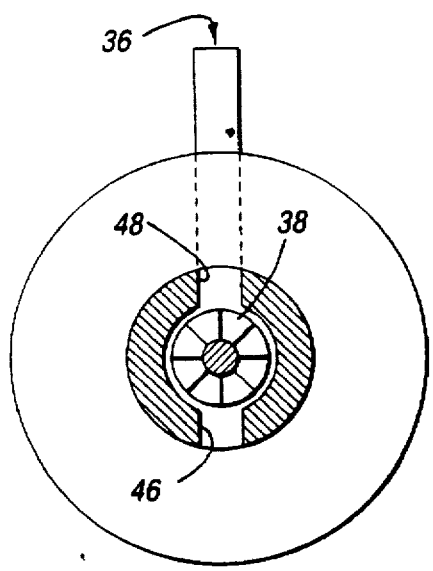
FIG. 2 shows a sectional view of the three-way valve shown in FIG. 1.

A magnetic armature 38 moves along the axial aperture 40 within the bobbin 12. The magnetic armature 38 includes plug members 42, 44 at opposing ends thereof to selectively block the inlet port 30 or outlet port 34 to discommunicate the respective port from the control port 36. As shown in FIG. 2, flow slots 46, 48 are formed around the armature 38 in order to allow fluid communication of the inlet and outlet ports 30, 34 with the control port 36 when the plug members 42, 44 are not blocking the respective ports.

A bracket 50 secures the polepieces 28, 32 with respect to the bobbin 12, and may be used for mounting of the assembly 12. The three-way valve assembly 10 is preferably encapsulated within housing 52, and only the ports 30, 34, 36 extend from the housing 52.

Figure 1A:
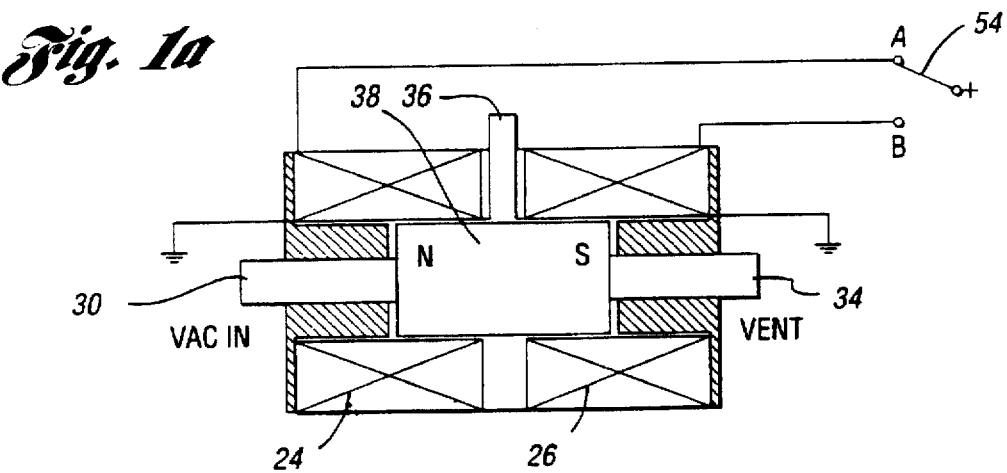
FIG. 1a shows a schematically arranged diagram of a three-way valve assembly in accordance with present invention.

The operation of the three-way latching valve assembly 10 is more clearly described with reference to the schematic diagram of FIG. 1a. The valve assembly 10 requires only an instantaneous pulse of voltage to actuate, thus eliminating the continuous current drain of prior designs. The armature 38 is shuttled between the first and second coils 24, 26 when the coils 24, 26 are respectively energized. The direction the armature 38 is shuttled is controlled by the electrical polarity applied to the coils 24, 26. Energizing one of the coils 24, 26 moves the armature 38 away from the energized coil. When the coils are de-energized, the armature 38 remains magnetically latched in position adjacent the nearest polepiece 28, 32. The control switch 54 is provided for selectively applying voltage to alternate coils 24, 26 for moving the armature 38.

In order to communicate the inlet port 30 with the control port 34, the first coil 24 is energized to repel the magnetic armature 38 toward the second solenoid 26. This movement causes the plug 42 to disengage the inlet port 30, thus communicating the inlet port 30 with the control port 36 by means of the flow slot 48. In this position, the plug 44 engages the outlet port 34, thereby blocking the outlet port 34. The magnet armature 38 remains magnetically latched to the second polepiece 32 when the voltage is removed.

In order to communicate the outlet port 34 with the control port 36, the second solenoid 26 is energized by movement of the switch 54, and the magnetic armature 38 is moved toward the first polepiece 28. The plug 42 blocks the inlet port 30, and the magnetic armature 38 remains magnetically latched against the first polepiece 28. In this position, the plug 44 has been removed from the outlet port 34, thus communicating the outlet port 34 with the control port 36.

Figure 3:
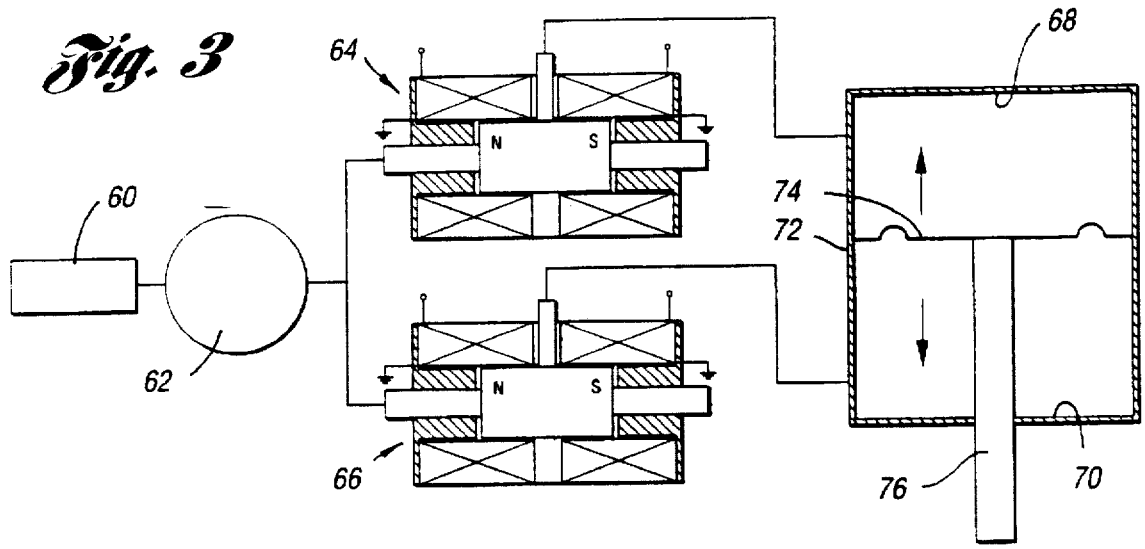
FIG. 3 shows a schematically arranged diagram of a pair of three-way valves for use with a vehicle axle disconnect actuator in accordance with the present invention.

FIG. 3 shows a preferred application of the latching three-way valve assembly. In this application, a vacuum source 60 is provided in fluid communication with a reservoir 62. First and second latching three-way valves 64, 66 are provided in communication with the reservoir 62. The first and second three-way valves 64, 66 are in fluid communication with opposing chambers 68, 70 of a vacuum motor 72. The first and second chambers 68, 70 of the vacuum motor 72 are separated by a diaphragm 74, which is connected to a vehicle axle disconnect actuator 76. When the reservoir 62 is communicated with the first chamber 68 of the vacuum motor 72 through the first three-way valve 64, the diaphragm 74 is drawn upward, and the axle disconnect actuator 76 is retracted. Alternatively, when vacuum is provided from the reservoir 62 through the second three-way valve 66 to the second chamber 70 of the vacuum motor 72, diaphragm 74 is moved to extend the axle disconnect actuator 76 for engagement of the vehicle axle. In this configuration, the outlet ports of the three-way valves 64, 66 act as vents in order to vent the vacuum between strokes of the axle disconnect actuator 76.

A three-way valve as described above could also be used for flow control in a vehicle climate control device.

Figure 4:
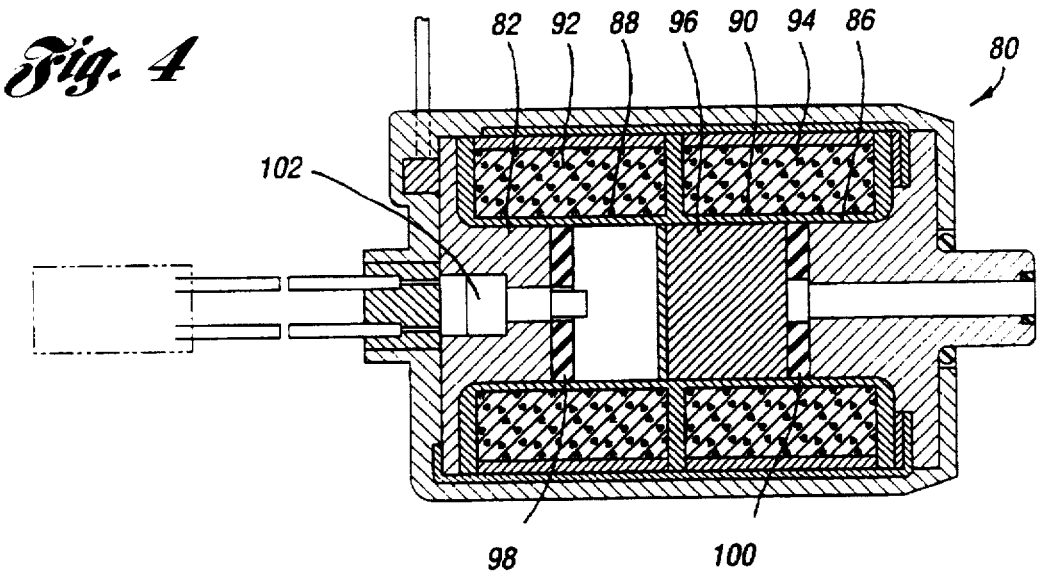
FIG. 4 shows a vertical cross-section of a latching engagement solenoid assembly in accordance with an alternative embodiment of the present invention.
Figure 5:
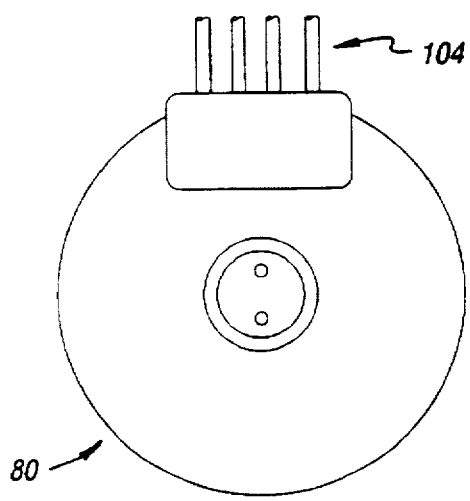
FIG. 5 shows an end view of the solenoid assembly shown in FIG. 4.

An alternative embodiment of the present invention is shown in FIGS. 4-7. FIG. 4 shows a vertical cross-section of a latching engagement solenoid assembly 80. The solenoid assembly 80 includes first and second polepieces 82, 84 disposed partially within opposing ends of a bobbin 86. The bobbin 86 forms annular channels 88, 90 for receiving first and second solenoids 92, 94. The magnetic armature 96 is disposed within the bobbin 86 for movement between the first and second solenoids 92, 94.

The first and second polepieces 82, 84 include rubber bumper members 98, 100 for engagement with the armature 96. A position sensor 102 is secured within the first polepiece for sensing the position of the armature 96 to send signals to a control unit (not shown) for actuating the solenoid assembly 80.

Figure 6:
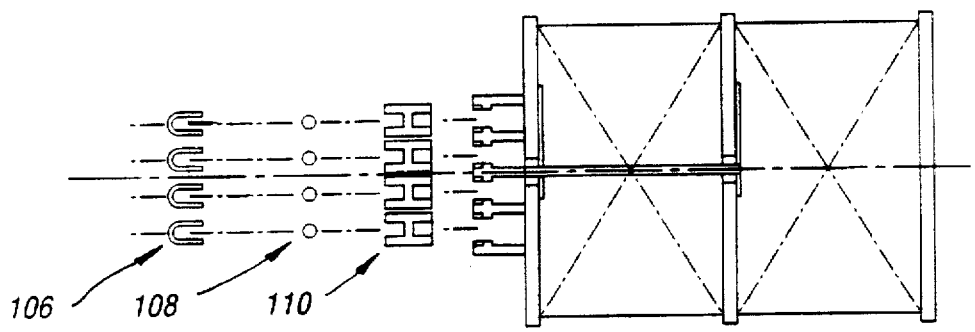
FIG. 6 shows an exploded top view of a bobbin and solenoid with appropriate electrical connectors in accordance with the embodiment shown in FIG. 4.

The electrical connectors 104 (shown in FIG. 5) connect the solenoids 92, 94 of the assembly 80 to a circuit assembly. As shown in FIG. 6, four lead-locks 106, rings 108, and standard siamese connectors 110 connect the solenoids 92, 94 to the electrical connectors 104.

The solenoids 92, 94 are connected in parallel. When the coils 92, 94 are energized with a DC voltage, the magnetic armature 96 is repelled from one coil and polepiece, and attracted to the other. Power is then turned off and the magnet 96 is "latched" to the polepiece of the attracting coil. When the polarity of the voltage is reversed, the solenoid operates in the reverse direction.

Alternatively, the coils 92, 94 could be energized separately in order to shuttle the magnetic armature 96 between the polepieces 82, 84. Again, the armature 96 remains magnetically latched when the coils are de-energized.

The advantages apparent with this embodiment are the resultant increased force and stroke over conventional solenoids. Additionally, when power is disconnected, the armature 96 will remain magnetically latched to the respective polepiece without the need for a spring. Since no spring is required, no force is wasted overcoming the spring, thereby alleviating an unnecessary current drain.

Figure 7:
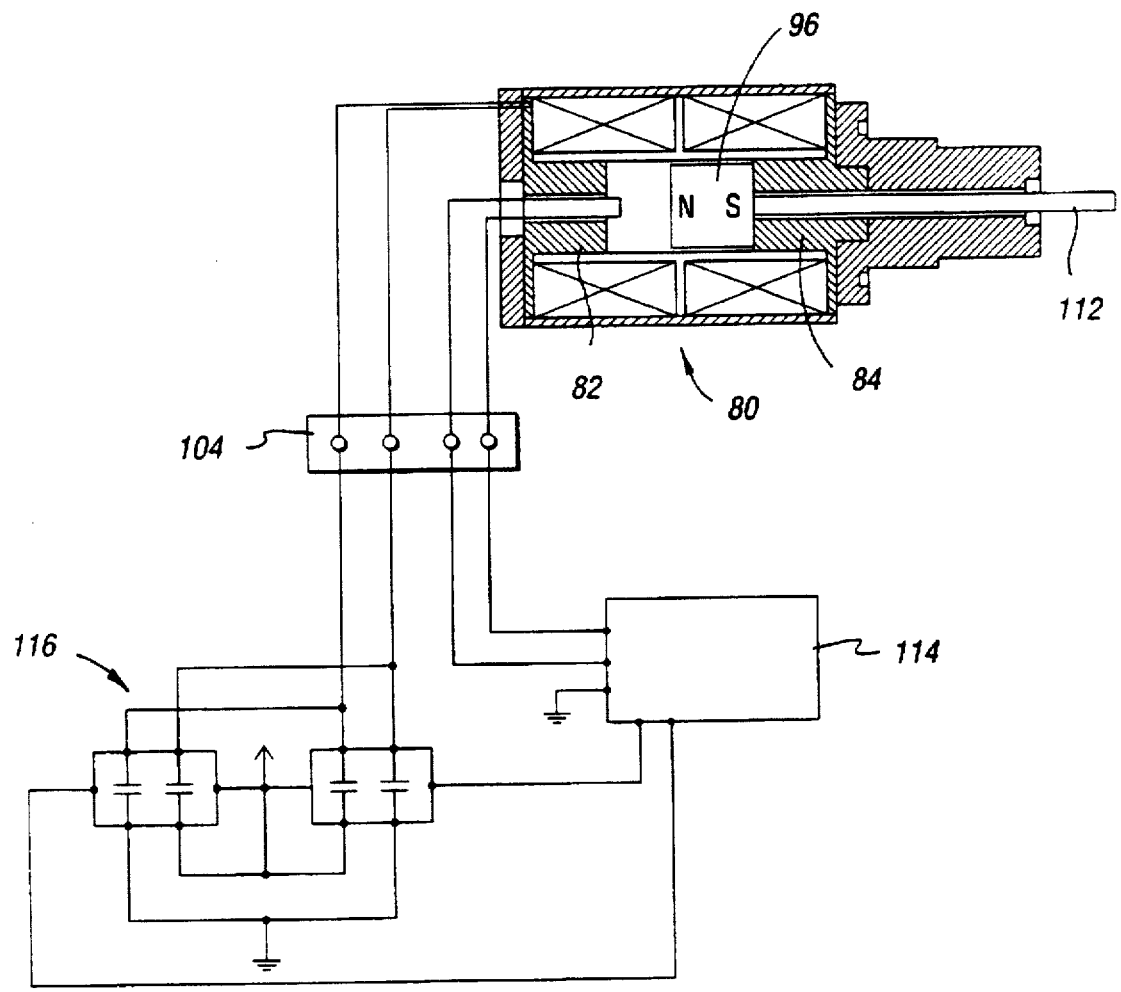
FIG. 7 shows a schematically arranged diagram of a solenoid assembly for use with an axle disconnect mechanism in accordance with the embodiment shown in FIG. 4.

FIG. 7 shows use of this embodiment for actuating a vehicle 4×4 center disconnect axle. FIG. 7 shows a latching engagement solenoid assembly 80 which is used to translate a latching member 112 for engaging and disengaging a 4×4 center disconnect axle as the armature 96 is shuttled between polepieces within the solenoid assembly 80. The electrical connectors 104 connect the solenoid assembly 80 to a vehicle computer 114 and a battery-switching circuit 116.

Figure 8:
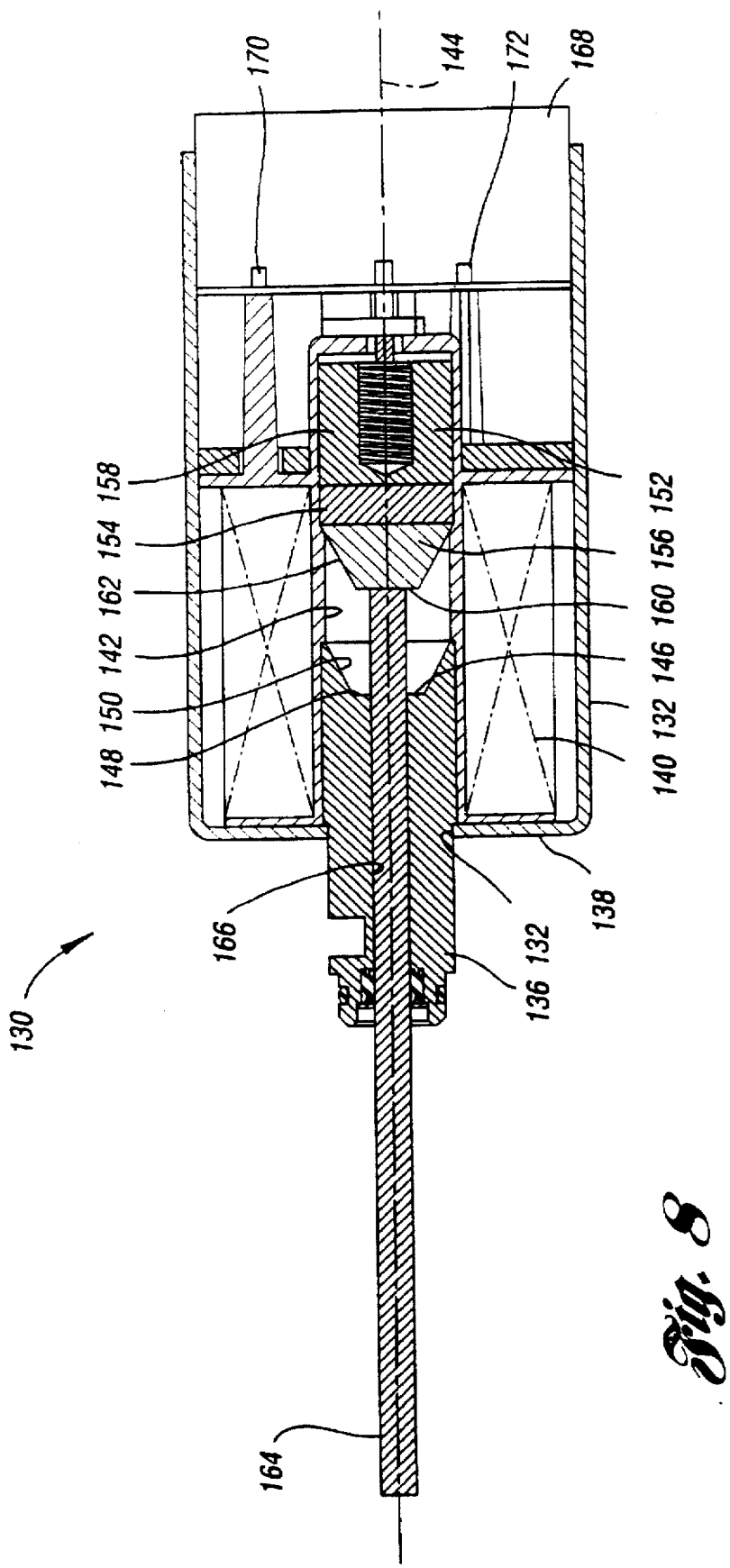
FIG. 8 shows a vertical cross-section of an electromagnetic actuator in accordance with yet another embodiment of the present invention.

Referring to FIG. 8, another embodiment of the present invention is shown. FIG. 8 shows an electromagnetic actuator 130 for use as a latching solenoid axle connector in a vehicle. The electromagnetic actuator 130 includes a cold-rolled steel housing 132 having a central opening 134 for receiving a polepiece 136. The polepiece 136 is also a cold-rolled steel component.

The housing 132 supports a bobbin 138, and the bobbin has a solenoid coil 140 wrapped therearound. The bobbin 138 has a central aperture 142 formed there-through along a central axis 144.

The metal polepiece 136 is rigidly secured in a position at least partially within the central aperture 142. The polepiece 136 has a depression 146 formed therein. The depression 146 includes a first flat 148 and a conical wall 150 formed at an angle of approximately 25° with respect to the central axis 144.

A movable armature 152 is slidably movable within the central aperture 142. The armature 152 includes a magnet 154 secured between first and second metal portions 156, 158. The magnet 154 is always positioned within the central aperture 142. The first metal portion 156 forms a protruding portion of the armature 152 which cooperates with the depression 146 and the polepiece 136. The first metal portion 156 includes a second flat 160 for engagement with the first flat 148 of the depression 146. The first metal portion 156 further includes a conical wall 162 formed at an angle of approximately 30° with respect to the central axis 144.

With this configuration, the first and second flats 148,160 may be in metal-to-metal contact while the conical walls 150 and 162 remain spaced apart. This configuration provides for increased travel of the armature 152 and concentrates magnetic flux lines through the flats 148 and 160 in a manner to increase the moving force of the armature 152. Also, with the magnet always positioned within the solenoid coil 140, moving force for the armature is increased dramatically.

An actuator rod 164 is secured to the armature 152 for movement with the armature, and extends through the aperture 166 and the polepiece 136 for acting as an axle connector.

The circuitry 168 for controlling the solenoid 140 is secured to the rear of the housing 132, and cooperates with solenoid connectors 170 and 172 for energizing the solenoid coil 140.

While the best modes for practicing the invention have been described in detail, those familiar with the art to which this invention relates will recognize alternative designs and embodiments for practicing the invention as defined by the following claims.

What is claimed is:

1. A magnetic latching solenoid assembly, comprising:
   a bobbin having a central aperture formed therethrough along a central axis and having a solenoid coil wrapped therearound;
   a metal polepiece component secured at least partially within the bobbin;
   an armature component slidably movable within said central aperture, said armature component including a magnet always positioned within said central aperture, wherein said armature component is at least partially metal;
   one of said components having a depression formed therein and a first flat formed at the bottom of the depression, said depression having a first wall formed at a first angle with respect to the central axis, and the other of said components having a protruding portion for cooperation with said depression, said protruding portion having a second flat formed thereon for metal-to-metal engagement with said first flat and having a second wall formed at a second angle greater than the first angle so that the first and second walls do not contact each other when the first and second flats are in contact.

2. The magnetic latching solenoid assembly of claim 1, wherein said first and second walls each form a conical shape.

3. The magnetic latching solenoid assembly of claim 1, wherein said first angle is approximately 25° and said second angle is approximately 30°.

4. The magnetic latching solenoid assembly of claim 1, wherein said polepiece component and first and second metal portions comprise cold-rolled steel.

5. The magnetic latching solenoid assembly of claim 1, wherein said polepiece component comprises an axial aperture formed therethrough.

6. The magnetic latching solenoid assembly of claim 5, further comprising an actuator rod secured to said armature component and extending through said axial aperture.

7. A magnetic latching solenoid assembly, comprising:
   a housing;
   a bobbin supported within the housing, said bobbin having a central aperture therethrough with a central axis and having a solenoid coil wrapped therearound;
   a metal polepiece component secured at least partially within said bobbin;
   an armature component slidably movable within said central aperture, said armature component including a magnet secured between first and second metal portions, said magnet always being positioned within said central aperture; and
   one of said components having a depression formed therein and a first flat formed at the bottom of the depression, said depression having a first wall formed at a first angle with respect to the central axis, and the other of said components having a protruding portion for cooperation with said depression, said protruding portion having a second flat formed thereon for metal-to-metal engagement with said first flat and having a second wall formed at a second angle greater than the first angle so that the first and second walls do not contact each other when the first and second flats are in contact.

8. The magnetic latching solenoid assembly of claim 7, wherein said first and second walls each form a conical shape.

9. The magnetic latching solenoid assembly of claim 7, wherein said first angle is approximately 25° and said second angle is approximately 30°.

10. The magnetic latching solenoid assembly of claim 7, wherein said polepiece component and first and second metal portions comprise cold-rolled steel.

11. The magnetic latching solenoid assembly of claim 7, wherein said polepiece component comprises an axial aperture formed therethrough.

12. The magnetic latching solenoid assembly of claim 11, further comprising an actuator rod secured to said armature component and extending through said axial aperture.

13. A magnetic latching solenoid assembly, comprising:

a housing;

a bobbin supported within the housing, said bobbin having a central aperture therethrough along a central axis and having a solenoid coil wrapped therearound;

a metal polepiece secured at least partially within said bobbin, said polepiece having a depression formed therein and a first flat formed at the bottom of the depression, said depression having a first wall formed at a first angle with respect to the central axis, said polepiece further comprising an axial aperture formed therethrough;

an armature slidably movable within said central aperture, said armature including a magnet secured between first and second metal portions, said magnet always being positioned within said central aperture, and said armature further including a protruding portion for cooperation with said depression, said protruding portion having a second flat formed thereon for metal-to-metal engagement with said first flat and having a second wall formed at a second angle greater than said first angle so that the first and second walls do not contact each other when the first and second flats are in contact; and an actuator rod secured to said armature and extending through said axial aperture.

* * * * *